UNITED STATES PATENT OFFICE.

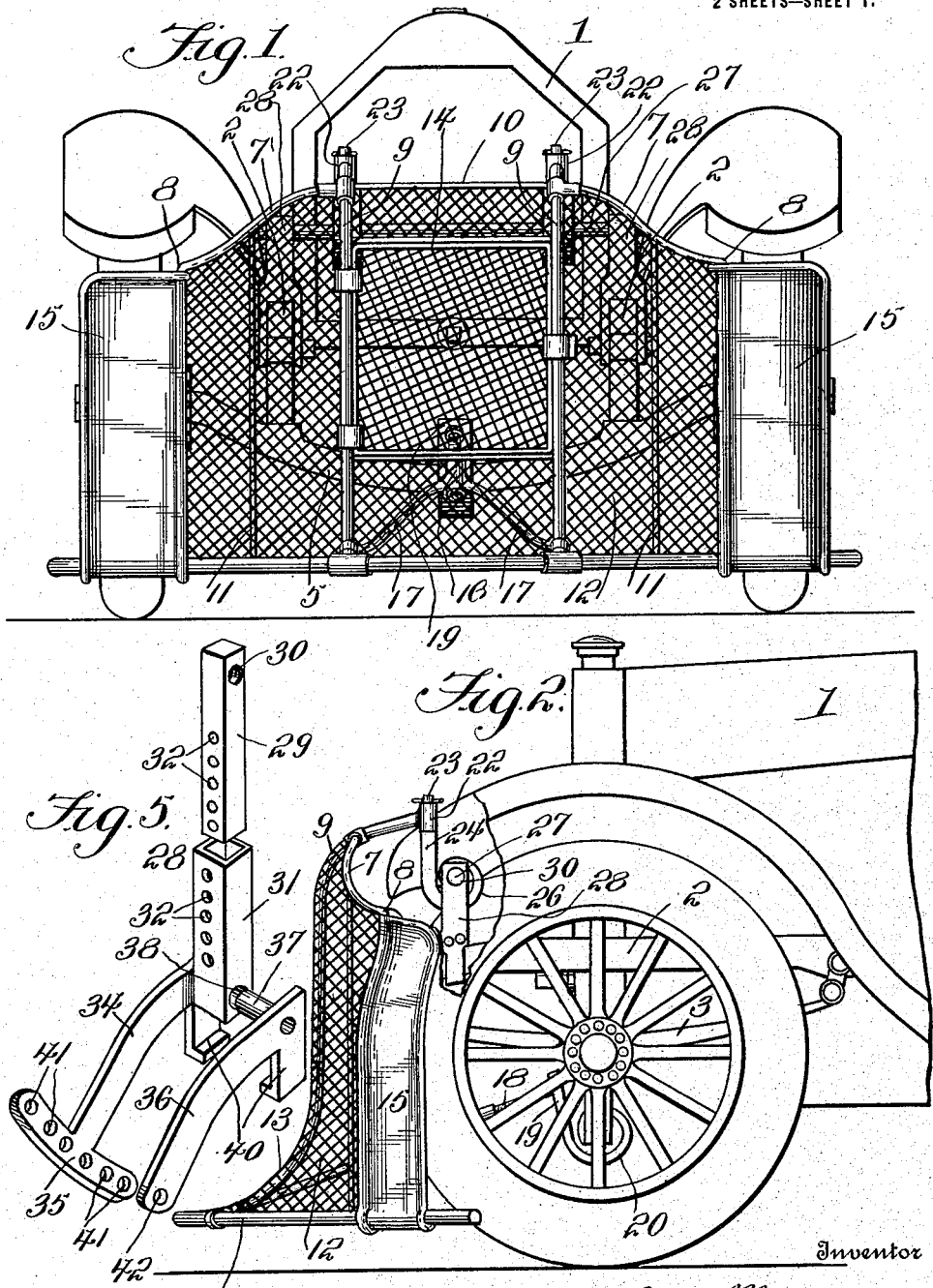

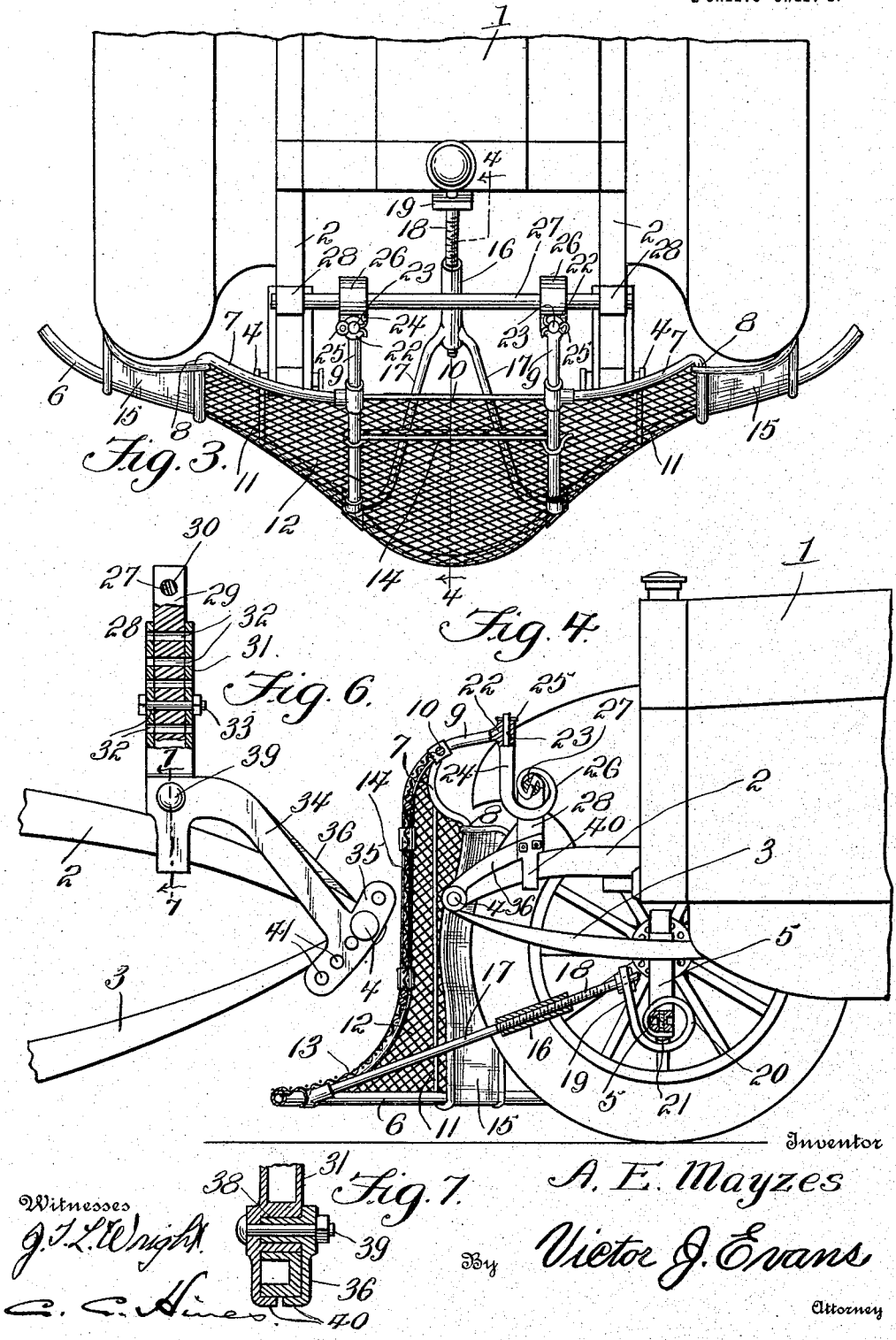

ARTHUR EDWARD MAYZES, OF CALGARY, ALBERTA, CANADA.

FENDER FOR AUTOMOBILES, &c.

1,170,307.        Specification of Letters Patent.        Patented Feb. 1, 1916.

Application filed August 4, 1915. Serial No. 43,668.

*To all whom it may concern:*

Be it known that I, ARTHUR E. MAYZES, a subject of the King of England, residing at Calgary, in the Province of Alberta and Dominion of Canada, have invented new and useful Improvements in Fenders for Automobiles, &c., of which the following is a specification.

This invention relates to fenders for automobiles, street cars, etc., the primary object of the invention being to provide a fender which is adapted to be readily and conveniently applied to any ordinary type of automobile or street car, and to effectually serve as a guard to prevent a person run down from getting under the wheels or being seriously injured.

A further object of the invention is to provide a fender which, while simple of construction and capable of being made and applied at a comparatively low cost, may be made as ornamental and attractive as desired.

A still further object of the invention is to provide a fender which embodies means for yieldingly supporting it so that it will effectually serve the function of a spring buffer.

A still further object of the invention is to provide a fender embodying means for adjustably mounting it to maintain it at a proper elevation and in proper relation to the front of the vehicle.

The invention consists of the features of construction, combination and arrangement of parts herein fully described and claimed, reference being had to the accompanying drawings in which:—

Figure 1 is a front elevation showing the application of the invention to an automobile. Fig. 2 is a side elevation of the same, parts being broken away to show the construction. Fig. 3 is a top plan view of the parts as shown in Figs. 1 and 2. Fig. 4 is a fragmentary side elevation of the vehicle and a vertical longitudinal section of the fender, the plane of section being indicated by line 4—4 of Fig. 3. Fig. 5 is a perspective view of one of the fender supporting brackets, showing the parts thereof disassociated and arranged in proper relative position. Fig. 6 is a side view of a portion of the vehicle, showing the application of the bracket illustrated in Fig. 5, a portion of said bracket appearing in section. Fig. 7 is a detail section on the line 7—7 of Fig. 6.

In the accompanying drawings I have shown the application of the fender to an automobile of ordinary or conventional construction, but it is to be understood that the invention may be applied with equal facility to street cars and other power driven vehicles.

In the drawings the numeral 1 generally designates the vehicle, 2 the side bars of the frame or chassis thereof, 3 the front suspension springs, 4 the shackle pins coupling said springs at their forward ends to the forward ends of the bars 2, and 5 the front axle of the vehicle.

The fender comprises a transversely curved frame structure, preferably made of rods or tubes, the frame, as shown, consisting of a lower continuous fender or buffer rod 6, upper frame rods 7, disposed on opposite sides of the center of the fender, outer and vertical frame rods 8 connecting the rod 6 some distance inwardly from its ends with the outer ends of the rod 7, intermediate or central upright rods 9 connecting the rod 6 with the inner ends of the rod 7 and disposed in spaced relation to each other, a brace 10 connecting the upper ends of the rods 9, and braces 11 connecting the rod 6 with the rod 7 at intermediate points between the rods 8 and 9. To the skeleton frame thus constructed is secured a body 12, of any suitable net work material, woven wire being employed if desired. The rod 6 is of a length to extend laterally beyond the line of the vehicle wheels and is curved or bulged out forwardly at a central point, the upper portion of the fender being approximately vertical, the said forwardly extending portion of the rod 6 being connected to the downwardly and forwardly curved or lower ends of the rods 8, 9 and 11, thus providing a horizontal portion 13 at the bottom of the fender serving as a shelf on which a person struck by the fender may be received and supported clear of the ground until the vehicle is stopped.

The central portion of the fender may be provided between the central uprights 8 with a door or gate 14, whereby access may be obtained to the radiator of the vehicle as well as to the starting crank. This lid or door may be hinged to one of the uprights 9 and provided with any suitable fastening means to engage the other upright 9, whereby it may be held normally closed. If desired side guards or shields 15 may be supported upon the ends of the bar 6 and the bars 8 of the fender frame, so as to come immediately in front of the vehicle wheels to prevent contact between the wheels and a person or other vehicle, the guards also serving to prevent a person who may be run down from falling under the wheels. Each of these guard shields or wings may consist of a suitable frame covered with leather or other preferred material.

The fender is supported at its base upon the vehicle by means of a layer supporting bracket, said bracket comprising a head 16 in the form of an internally threaded tube or sleeve, having fork arms 17 extending downwardly and forwardly in diverging relation and connected with the rod 6 and rods 9 at their points of juncture. This sleeve receives and adjustably engages a threaded rod or stem 18 which is connected with one of the ends of a supporting spring 19, the other end of said spring being coiled, as shown at 20, and secured in any suitable manner to the axle 5, as shown at 21. By this construction the lower portion of the fender will be yieldingly supported from the front axle of the vehicle so as to permit it to move downwardly and rearwardly when an object is struck to cushion the force of the blow. This construction of connection between the fender and axle also provides for the adjustment of the lower portion of the fender with relation to the axle to properly space the fender from the front of the vehicle.

The fender is supported at its upper portion from the forward ends of the bars 2 by yielding, adjustable and detachable brackets, and as shown these brackets are connected with the upper ends of the rods 9. Formed upon the upper ends of said rods are sleeves 22 receiving reduced pins or coupling stems 23 upon the upper ends of suspending springs 24, said stems being apertured for the reception of fastening keys 25. The other ends of the springs 24 are coiled, as shown at 26, and such coiled ends of the springs are fastened by bolts or screws 27 to the upper adjustable sections or bracket members 28. Each of these bracket members consists of an upper adjustable section or bar 29, having a threaded opening 30 to receive the bolt 27. This bar 29 is fitted within a sleeve 31, and the bar 29 and sleeve 31 are provided with series of perforations 32 adapted to register and to interchangeably receive a fastening bolt 33, whereby the bar 29 may be disposed at different elevations to support the fender at a greater or less distance above the surface of the ground or to provide for the attachment of fenders varying in height.

As shown in the present instance, the bolt 27 is shown in the form of a connecting rod which couples the bars 29 of both upper adjustable supporting brackets together, by which a firm support for the fender is obtained. The sleeve section 31 of each bracket is provided with a downwardly and forwardly curved arm 34 which is rigid at one end with said sleeve and terminates at its opposite or forward end in a transversely disposed arcuate fastening member 35. Arranged for coöperation with the arm 34 is a similar arm 36, which is formed independent of the sleeve but is provided with a tubular projection 37 passing through a transverse opening 38 in the sleeve and arm 34, said tube and opening being adapted for the passage of a fastening bolt 39, whereby the parts are adjustably united. The arms 34 and 36 are provided with jaws 40 which are flanged to extend under the bar 2 and form a clip to engage said bar, whereby the bracket is secured to the bar, as shown particularly in Fig. 7. The member 35 at the forward end of the arm 34 is provided with a series of apertures 41 on an arc concentric with the bolt 39, and the arm 36 is provided with an aperture 42, which apertures in the arms are adapted to engage the shackle pin or bolt 4, whereby the bracket is fastened to the bar 2 and spring 3 against vertical, longitudinal or lateral displacement. The construction described also adjustably connects the bracket with the shackle bolt so that the bracket may be rocked on the bar 2 in the direction longitudinally of the vehicle to provide for the support of the bracket in an absolutely vertical position under different conditions of service. This mode of adjustment, which is a tilting one, and may be employed to position the base of the fender horizontally or at an angle to the surface of the ground, is employed in coöperation with the adjustment afforded by the connection between the bracket 16 and spring 19, by which the distance between the fender bar 6 and spring 19 may be lengthened or shortened to compensate for the first-named adjustment, as will be readily understood.

From the foregoing description, taken in connection with the drawings, it will be seen that my invention provides a fender which may be made light in weight, and yet strong and durable in construction, and which may be readily and conveniently applied to any ordinary vehicle of the character described and yieldingly supported for a cushioning action, the supporting connections permitting adjustment to dispose the device at proper elevations and at different angles to the surface of the ground as occasion may require in vehicles differing in dimensions and other particulars.

While the particular construction disclosed is preferred, it is to be understood that modifications within the scope of the appended claims may be made without departing from the spirit or sacrificing any of the advantages of the invention.

I claim:—

1. A fender for automobiles including a hanger for pivotal connection with the vehicle at opposite sides of the center thereof, a fender proper carried by said hanger, and means for adjustably connecting the fender proper with the vehicle at a point below and on a line between the points of attachment of the hanger.

2. A fender for automobiles comprising a fender proper, a horizontal transverse fender bar, means yieldingly connecting the fender proper with said hanger bar, means for pivotally connecting the ends of the hanger bar with the machine frame at opposite sides of the latter, and an adjustable connection between the fender proper and the frame at a point below and between the points of connection of the hanger bar therewith, said adjustable connection being adapted to permit of the pivotal adjustment of the fender proper with relation to the surface of the ground.

3. In a fender for automobiles, the combination with the front axle and side bars of the chassis of such vehicle, of a horizontal transverse hanger bar, means connecting said hanger bar with said side bars, a fender yieldingly supported from said hanger bar, and a yielding supporting connection between the fender proper and the front axle.

4. In a fender for automobiles, the combination with the front axle and side frame bars of the vehicle, of a horizontal cross bar detachably and pivotally connected with said frame bars, a fender proper, spring supporting connections between the hanger bar and fender proper, and a spring supporting connection between the fender proper and the front axle, and said connection being adjustable to adjust the fender proper upon the said pivotal connections.

5. In a fender for automobiles, the combination with a vehicle having side frame bars and a front axle, of a horizontal transverse hanger bar, pivotal supporting connections between the same and said frame bars, a fender proper provided with a pair of spaced suspension bars, spring supporting connections between the same and said hanger bar, a bracket connected with the fender proper below and on a line between said suspension bars, a spring support connected with the front axle, and an adjustable connection between the same and said bracket.

6. A fender including a fender body, a hanger spring for supporting the lower portion of the fender body, an adjustable bracket connection between said hanger spring and the central portion of the base of the fender frame, supporting springs connected with the upper portion of the fender body on opposite sides of the center thereof, and adjustable hanger brackets for mounting said springs upon the vehicle.

7. In a fender for automobiles, the combination with the front axle, longitudinal side bars of the chassis and front springs associated with said bars, of a fender body, a supporting spring centrally connected to the axle, a longitudinally adjustable bracket connecting said spring with the central part of the base portion of the fender, vertically adjustable brackets upon the said longitudinal bars, adjustable connections between said brackets and the coupling springs between the bars and vehicle springs for holding said brackets in an upright position, suspending springs carried by said brackets, and connections between said suspending springs and the fender on opposite sides of the upper portion of the latter.

In testimony whereof I affix my signature in presence of two witnesses.

ARTHUR EDWARD MAYZES.

Witnesses:
  H. A. CHADWICK,
  MADGE BLOOMFIELD.

Copies of this patent may be obtained for five cents each, by addressing the "Commissioner of Patents Washington, D. C."